Figure 5:
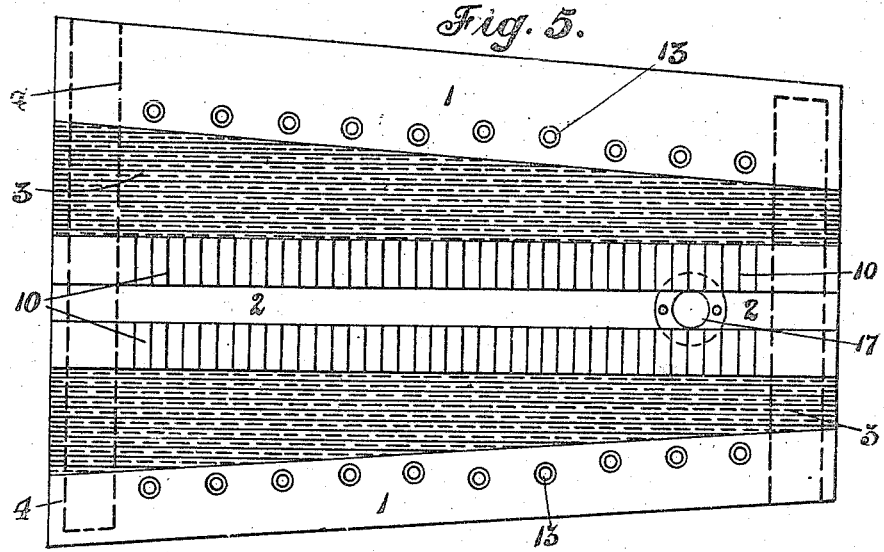

July 17, 1923.
H. RAMSDEN
1,461,832
COVER OR GAITER FOR LAMINATED VEHICLE SPRINGS
Filed Feb. 14, 1922    3 Sheets-Sheet 1
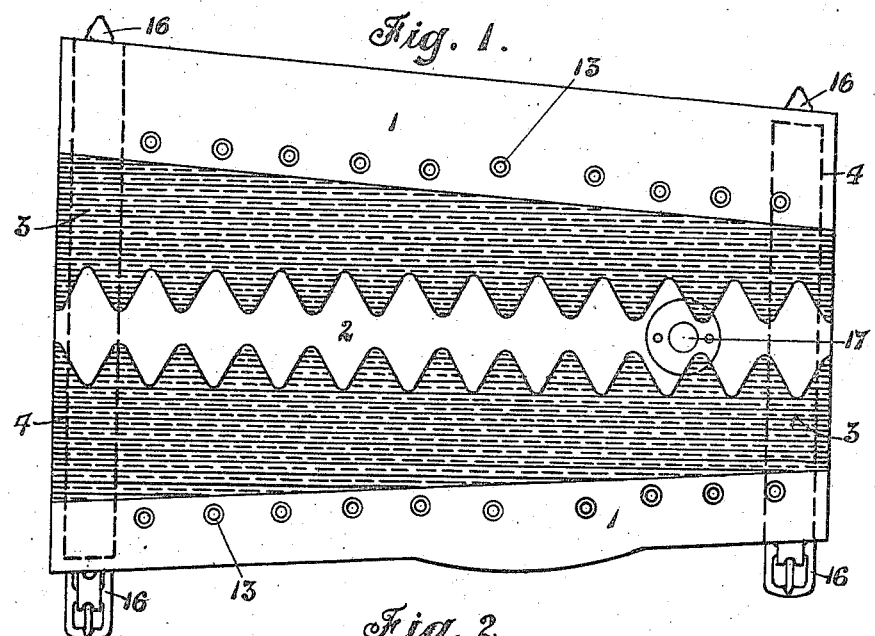
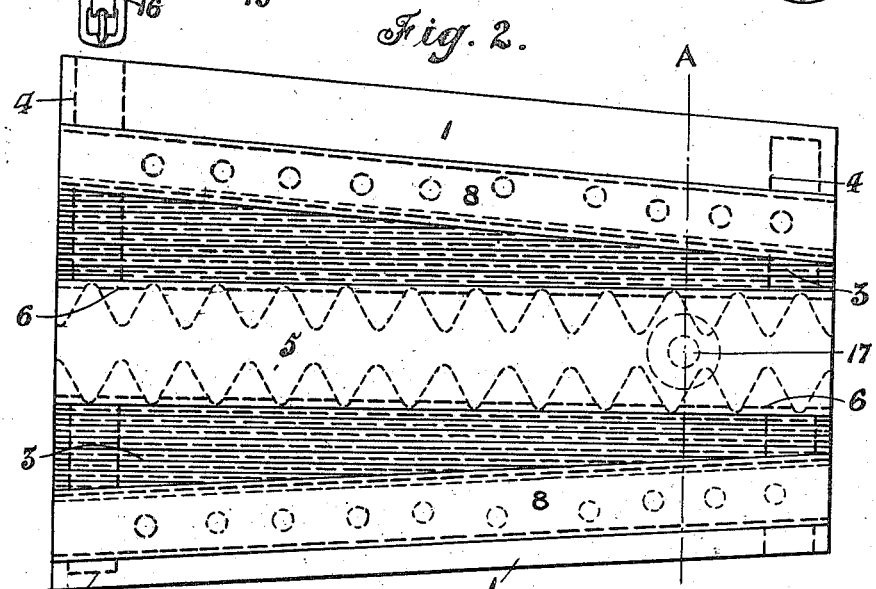
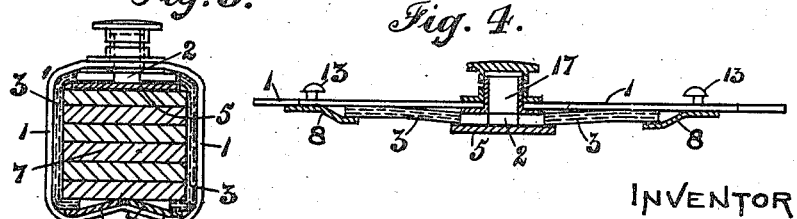
WITNESSES
INVENTOR
HENRY RAMSDEN.

July 17, 1923.

H. RAMSDEN

COVER OR GAITER FOR LAMINATED VEHICLE SPRINGS

Filed Feb. 14, 1922    3 Sheets-Sheet 2

WITNESSES.
Abra Reed
Charles Sutcliffe

INVENTOR
HENRY RAMSDEN.
Per John R. Walsh
Attorney

Patented July 17, 1923.

1,461,832

UNITED STATES PATENT OFFICE.

HENRY RAMSDEN, OF BRADFORD, ENGLAND.

COVER OR GAITER FOR LAMINATED VEHICLE SPRINGS.

Application filed February 14, 1922. Serial No. 536,547.

*To all whom it may concern:*

Be it known that I, HENRY RAMSDEN, a subject of the King of Great Britain, residing at Bradford, in the county of York, England, have invented new and useful Improvements in Covers or Gaiters for Laminated Vehicle Springs, of which the following is a specification.

This invention relates to the construction of covers or gaiters enclosing laminated vehicle springs of the type containing felt pads or other absorbent material placed or wrapped more or less around the spring, which pads have a slot or oil reservoir formed therein supplied with oil or grease through an oil cap, nipple, or filling opening, in the cover, whence it either filters through the said pad to the sides of the spring or passes thereto partly by way of transverse channels leading from the longitudinal groove formed therein, for the purpose of lubricating the contacting surfaces of the laminations thereof, and my object is to provide an improved construction of such gaiters whereby an uniform, quicker, and more efficient lubrication of such springs takes place simultaneously on both sides throughout the length of the cover or gaiter, with due regard to economy in lubricant.

According to my invention I construct my improved gaiter of leather, sheet metal, or other suitable flexible material, or a combination thereof of the well known shape provided with the usual oil cap or filling opening. Running longitudinally of the gaiter I attach two strips of wicking or other similar absorbent material of a desired thickness placed a suitable distance apart. The trough or channel thus formed between the two wickings or pads may be covered by a strip of leather or other suitable material if desired, and when the gaiter is placed in position upon the spring the leather strip serves as the bottom of the channel, the wickings the sides, and the body of the gaiter as the top thereof. Each piece of wicking is of sufficient width to overhang the sides of the spring in the usual manner. Or the leather or the like strip may be dispensed with, and the top of the spring made to serve as the floor of the channel. In order to facilitate the absorption and flow of the lubricant from the channel aforesaid as well as increase the holding capacity of the channel, I serrate the inner edges of the wickings lying on the top of the spring which correspondingly increases the length of the edges bordering the channel, besides allowing the lubricant to approach the sides of the spring before it is intercepted and absorbed by the wickings for transmission to the laminations of the spring.

Or the two wickings may be placed vertically against the sides of the spring in contact with the laminations thereof, and the aforesaid channel or reservoir for the supply of lubricant thereto formed by two fluted or corrugated strips of metal, vulcanite, leather or other suitable material similarly attached to the cover or gaiter the required distance apart. The corrugations may run either at right angles or at oblique angles to the said channel, and provide a series of short channels or conduits leading therefrom to the aforesaid wickings for the purpose of quickly and directly conducting and discharging the lubricant from the reservoir on to the upper edges thereof where it commences to seep into the said wickings and is gradually delivered by the latter directly to the sides of the laminations as aforesaid.

The channel and corrugations may, if desired, be provided with a covering plate fitted thereon so as to prevent the possibility of such corrugations similarly affecting the gaiter. Or the channel and corrugated strips may be formed in one piece if desired, and the channel may rest upon a leather or other strip in order to cause the transverse channels to dip towards the sides of the spring. By reversing the channel portion and corrugations the top of the spring may be made to serve as the floor of the oil channel. Also, the wickings may be dispensed with and the corrugated strips intended so as to overlap or envelope the sides of the spring, with or without the covering plate aforesaid, whereby oil or grease may pass direct from the channel to the laminations of the spring.

Also, a strip of leather or the like may be attached to the gaiter so as to fit over each line of hooks for increasing their stability, and by further attachment to the outside edges of the wickings or the like, lubricant is prevented from escaping through any joint in the gaiter or outer cover.

By these means and in this manner the lubricant from the central channel or reservoir, traverses the length of the cover, and is distributed and conducted with the least delay to those parts of the spring requiring lubrication.

Figure 6:
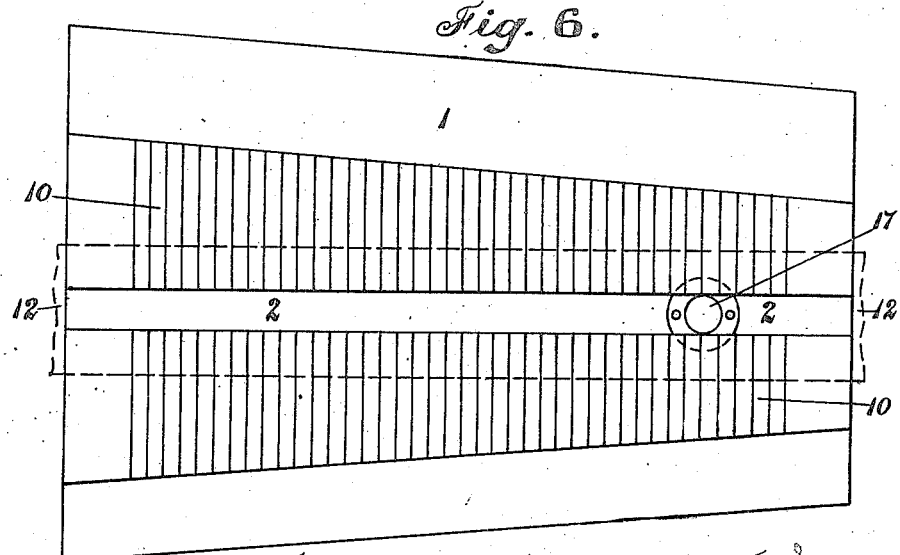
Figure 7:
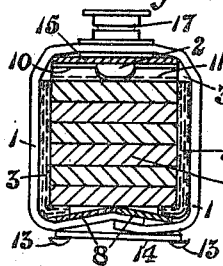
Figure 8:
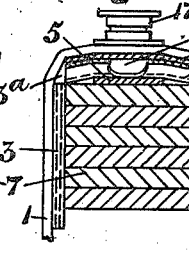
Figure 9:
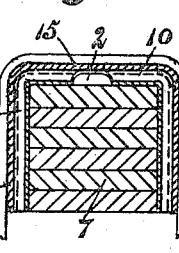
Figure 10:
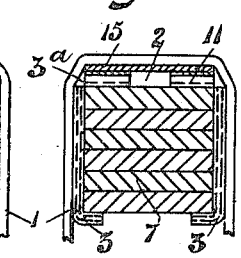
Figure 11:
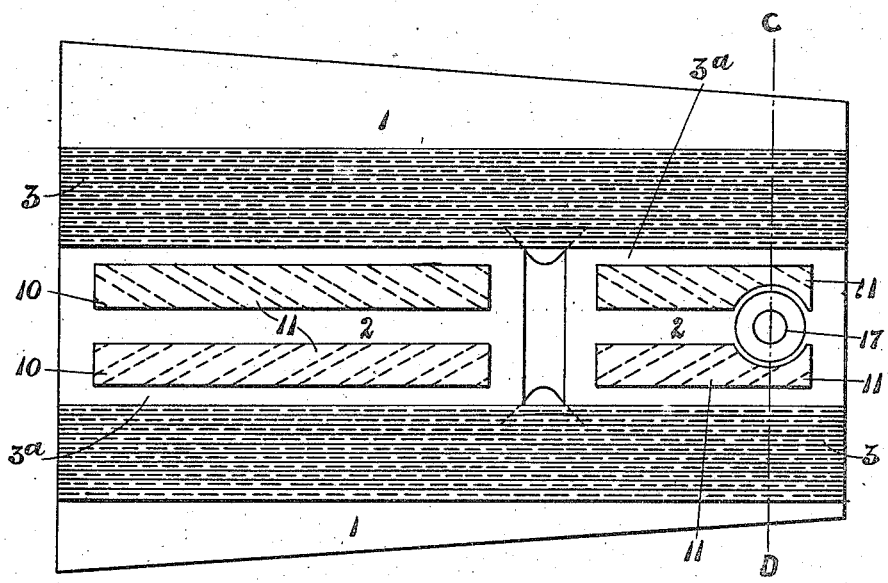
Figure 12:
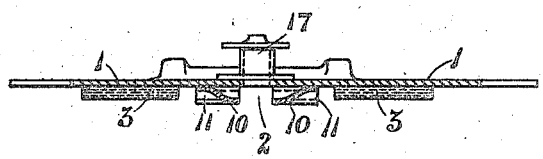

I attain these objects by the mechanism illustrated in the accompanying drawings, in which; Fig. 1 is a plan view of my improved gaiter opened out, showing the wicking imposition thereon; Fig. 2 is a similar view, with a leather or the like, strip covering the serrated edges of the wickings and serving as the floor of the oil reservoir; Fig. 3 is a cross section of a laminated spring with my improved gaiter shown at Fig. 2 in position thereon; Fig. 4, is a cross-section of Fig. 2, through the line A, B; Fig. 5 is a modification of the gaiter shown at Figs. 1, 2, 3 and 4; Fig. 6, is similar to Fig. 5 without the wicking and with the angular conduits leading from the oil reservoir down the sides of the spring; Fig. 7 is a cross-section of a laminated spring with the gaiter shown at Fig. 5; Fig. 8, is similar to Fig. 7, with a thickening strip beneath the oil reservoir causing the oil conduits to dip towards the sides of the spring; Fig. 9, i a similar view of spring with the gaiter shown at Fig. 6, thereon; Fig. 10 is another similar view of the spring with the gaiter shown at Fig. 5, having separate corrugated strips, and arranged so that the top of the spring serves as the floor of the oil reservoir; Fig. 11 is a modification of my improved gaiter opened out, showing the oil conduits running at an oblique angle to the oil reservoir, and with an embossed portion to receive the spring clip; and Fig. 12 is a cross-section of Fig. 11 on the line C, D.

Similar letters refer to similar parts throughout the several views.

Referring to Figs. 1, 2, 3, and 4 of the drawings, 1 is the body of the cover or gaiter. 2 is a channel trough or oil reservoir formed on the inside of such cover by the arrangement and attachment thereto of two wickings or absorbent strips or pads 3, 3, placed a suitable distance apart. The strips 3, 3, are attached to the cover at each end by the sewing 4, 4, or other suitable means, and the length of the said channel corresponds approximately with that of the cover. 5 is a leather or the like strip of a suitable thickness which is attached to the cover over the inside edges of the strips 3, 3, by the sewing 6 or the like for maintaining the said edges parallel and for serving as the floor of the channel or reservoir 2 when the gaiter is in the position upon the spring, shown at Figs. 2, 3 and 4. The thickness of the strip 5 causes the wickings to dip towards the sides of the spring and so increases the gravitation or speed of flow of the oil or lubricant through the same to the contacting parts of the laminations 7 of the spring. Also for increasing the holding capacity of the channel 2, and for further augmenting the flow of the lubricant, the inside edges of the wickings are serrated. 8 are strips of leather or other suitable flexible material, see Figs. 2, 3 and 4, which are placed over the usual line of hooks, on the inside of the cover, and are secured thereto by sewing or the like, near the outside longitudinal edges of the wicking and of the strips 8, both for strengthening the cover and for preventing escape of lubricant therefrom.

Referring to Figs. 5, 6, 7, 8, 9 and 10 of the drawings, 10 are corrugated strips of sheet metal, leather, or other suitable material attached to the cover 1 a suitable distance apart to form the channel 2, and also the channels 3$^A$ at the top corners on each side of the spring, see Figs. 7, 8 and 10. The corrugations provide a series of transverse channels or conduits 11 for the passage of the lubricant direct from the channel 2 to the channels 3$^A$ bordering the upper edges of the wickings 3, 3, which in this case are placed vertically against the sides of the spring, the wickings receive and absorb the lubricant from the channels 3$^A$ and gradually deliver the same to the lamination of the spring.

In the different forms of gaiters herein described, the lower edges of the wickings are turned under the spring in the usual manner, with the strips 8 attached thereto, the latter as shown at Fig. 7, and are effectually secured in this position when securing the gaiter, by the usual line of hooks 13, and laces 14 in the ordinary manner. The transverse passages aforesaid, like the serrations in the wickings also serve to increase the holding capacity of the oil channel or reservoir, and the oil or other lubricant passes direct to the wickings for the gradual and immediate relief of the spring.

Referring to Figs. 7, 8, and 9 I may construct the corrugations and channel in one piece of sheet metal, leather, or the like. In Fig. 8 the strip 5 is secured thereto in the manner shown at Fig. 3, and for the same purpose. In Fig. 9 the wickings are shown dispensed with and the transverse channels or corrugations extended so as to overlap or envelope the sides of the spring, and by reversing the channel 2 therein, the top of the spring may be made to serve as the floor thereof as aforesaid. By this construction of gaiter, the oil grease or other lubricant passes direct to the laminations.

To prevent the corrugations similarly affecting the cover, a corresponding flat sided covering plate or cover 15 may be employed if necessary, as shown in the several views affected.

Referring to Figs. 11 and 12, the corrugations or transverse channels 11 are shown running obliquely to the central channel or reservoir 2, whereby the flow of lubricant from the oil cup more readily enters the same and reaches the side channels 3$^A$, 3$^A$, running along the upper edges of the wickings 3, 3, for the purposes aforesaid.

In order to effectually secure the gaiter to the spring at each end by the customary straps 16, the corrugations terminate a suitable distance from each end, as shown at Figs. 5 and 6. 17 is the usual oil cap or filling opening fixed in the gaiter near the highest point of the spring.

What I claim to be my invention and desire to secure by Letters Patent is:—

1. A gaiter for laminated springs comprising a flexible body having a pair of absorbent pads secured to the inside thereof and arranged to form a longitudinal central channel coextensive of said body, the opposed inner edges of said pads being serrated so as to uniformly distribute the lubricant in the channel to the sides of the body.

2. A gaiter for laminated springs comprising a body having a pair of absorbent pads secured to the inside thereof and arranged to form a longitudinal channel coextensive of said body, a strip of material attached to the body connecting the absorbent pads together and serving as a flooring for said channel, and means providing a direct communication between said channel and the sides of the gaiter.

3. A gaiter for laminated springs comprising a flexible body having a pair of absorbent pads secured to the underside thereof and arranged to form a longitudinal central channel coextensive of said body, a strip of material attached to the body connecting the absorbent pads together and serving as a flooring for said channel, and means providing a direct communication between said channel and the sides of the gaiter.

4. The combination with a laminated spring, a gaiter having a pair of pads secured to the inside thereof and arranged to form a longitudinal central channel coextensive of said gaiter, a strip of flexible material connecting the inner edges of said pads together and adapted to cause the sides of the pads to dip when the gaiter is secured to said spring, means for supplying a lubricant to said channel, and means for simultaneously distributing the lubricant uniformly to both sides of the spring.

5. The combination with a laminated spring, a gaiter having a pair of pads secured to the inside thereof and arranged to form a longitudinal channel coextensive of said gaiter, means for supplying a lubricant to said channel, said pads having serrated inner edges forming transverse passages for uniformly conducting the lubricant from the said channel to the sides of the spring, and means for removably securing the gaiter to the spring.

6. The combination with a laminated spring, a gaiter having a pair of pads secured to the inside thereof and arranged to form a longitudinal channel coextensive of said gaiter, means for supplying a lubricant to said channel, said pads having serrated inner edges forming transverse passages for uniformly conducting the lubricant from the said channel to the sides of the spring, a strip of flexible material connecting the inner edges of said pads together and adapted to cause the sides of the pads to dip when the gaiter is secured to said spring, means for supplying a lubricant to said channel, and means for conducting the lubricant uniformly to the laminated sides of the spring.

7. The combination with a laminated spring, a gaiter having a pair of pads secured to the underside thereof to form a median groove coextensive of said gaiter, a strip of flexible material attached to and connecting the pads together, said strip adapted to engage the top of the spring and cause the pads to dip when the gaiter is secured to the springs, means for supplying said groove with a lubricant, means providing a direct passage between said groove and the sides of the spring, and means attached to said gaiter adjacent the outer edges of said pads for preventing the escape of the lubricant therefrom.

In testimony whereof I have signed my name to this specification.

HENRY RAMSDEN.